July 6, 1965 C. L. McGHEE 3,193,787

PRINTED CIRCUIT BOARD CONNECTOR

Filed March 1, 1962 2 Sheets-Sheet 1

INVENTOR.
Clarence L. Mc Ghee

BY Cecil L. Wood

ATTORNEY

PRINTED CIRCUIT BOARD CONNECTOR

Filed March 1, 1962 2 Sheets-Sheet 2

INVENTOR.
Clarence L. McGhee
BY Cecil L. Wood
ATTORNEY

United States Patent Office 3,193,787
Patented July 6, 1965

3,193,787

PRINTED CIRCUIT BOARD CONNECTOR

Clarence L. McGhee, 4420 Kushla St., Dallas, Tex.

Filed Mar. 1, 1962, Ser. No. 176,624
2 Claims. (Cl. 339—17)

This invention relates to connectors for printed electrical circuits used especially in micro-miniature circuitry, generally referred to as printed circuits, and often comprising a plurality of superposed or stacked printed circuit boards, some of which have circuits printed on both sides.

Conventional connectors for so-called printed circuits are not readily adapted to be easily repaired, due to the compactness and inaccessibility of the circuits when stacked, or in superposed arrangement, thus often requiring considerable expense and time in the replacement of terminals and effecting repairs.

A prime object of the invention, therefore, resides in the provision of a simple and inexpensive connector element adapted to be readily installed in existing circuits to facilitate the repair of broken connection, or to by-pass a defective connection therein.

Heretofore connectors for micro-miniature circuits have been made available which are so constructed as to afford very limited access to portions of the circuits which, when broken or interrupted for any reason, cannot be repaired without resorting to dismantling the installation so that the defects can be corrected.

These conventional connectors generally comprise mating elements of different lengths formed with relatively closely spaced cells or receptacles for the reception of contact terminals to which various portions of the circuits are connected so that by joining the mated sections of the connectors the circuits are completed.

An object of the invention is that of providing a terminal contact element in which is embodied a unique arrangement by which a complex circuit can be repaired, modified or completely interconnected with either circuits with a minimum of effort and time, and without unduly disrupting the circuitry functions or affecting the circuit board assembly.

Broadly, the invention contemplates the provision of a connector for micro-miniature or printed circuits which, by its use, will afford ready access to all portions of the circuits, regardless of the complexity thereof, so that any such circuit may be easily and quickly repairable.

While the foregoing objects are paramount, other and lesser objects will become manifest as the description proceeds, when taken in connection with the appended drawings wherein.

Figures 1, 2, 3, 4, 5:
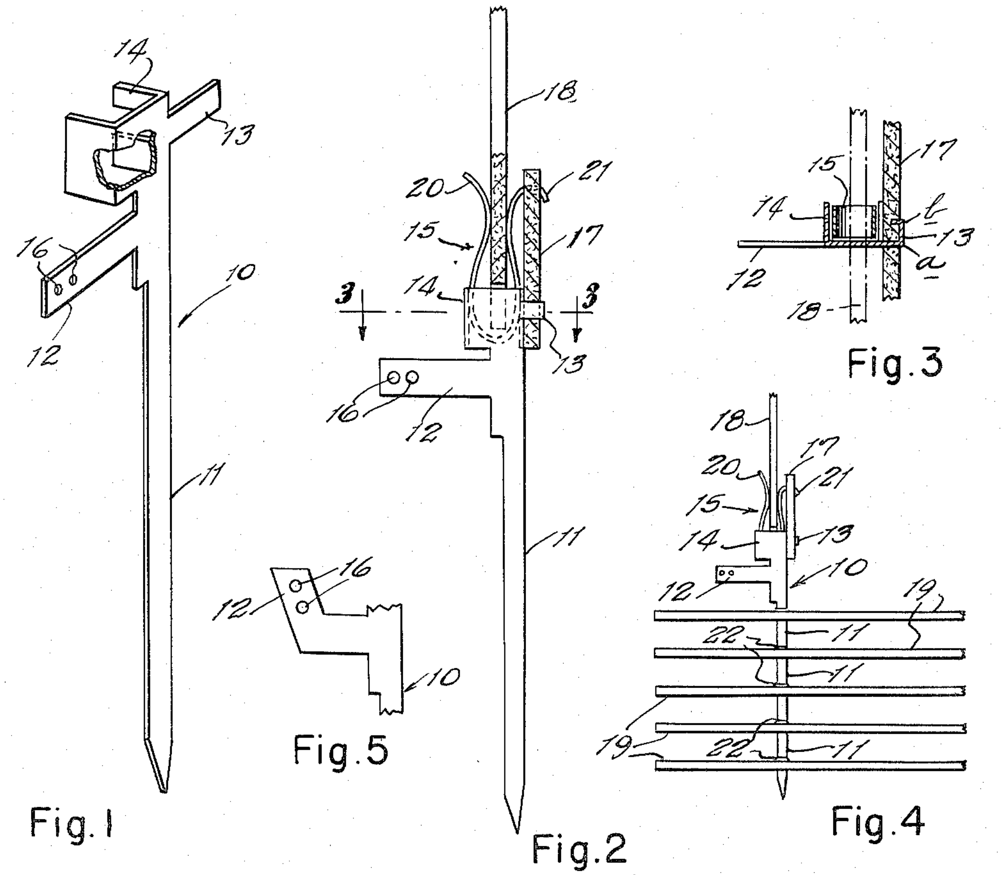
FIGURE 1 is a perspective illustration of the preferred form of the invention showing the elongated tang, or coupler shank, and lateral tab.
FIGURE 2 is an elevational view of the invention as applied to a support strip and a printed circuit board, the support strip being shown in section and the circuit board in partial section.
FIGURE 3 is a fragmentary illustration, on line 3—3 of FIGURE 2, in partial section, showing the invention attached to a support strip, and showing a circuit board in broken lines.
FIGURE 4 is an elevational view illustrating the invention traversing a plurality of superposed circuit boards, the latter being fragmentarily shown.
FIGURE 5 is a fragmentary elevational view of the invention showing a modified terminal tab.

Accordingly, the invention comprises, in its broad sense, a body, generally designated by the numeral 10, which may be formed by a suitable die from relatively thin sheet materials composed of alloys best suited for electrical conductivity, and is provided with an elongated tang or shank portion 11 which may be pointed at its extremity, as shown in FIGURES 1, 2, 4 and 10, and a head portion which comprises a plurality of offset lateral projections defining a terminal tab 12, a securing clip 13 and a socket 14, the latter being preferably substantially rectangular in plan, as shown in FIGURE 3, to frictionally receive a tensioned contact element 15, such as illustrated in FIGURES 2, 3 and 4.

The securing clip 13 is adapted to extend at right angles from the tang 11 and on the opposite side thereof from the terminal tab 12 which may be provided with one or more solder apertures 16 for the securement of conductors (not shown). The clip 13 is provided for securing the body 10 to a supporting strip 17, in the manner shown in FIGURES 2 and 3, as by penetrating the strip 17 and forming two right-angle bends *a* and *b* in the clip 13 so that the inwardly directed outer tip thereof is embedded in the strip 17 and the socket 14 is then impinged against the opposing surface thereof and the terminal tab 12 extends at right-angles from the planar surface of the supporting strip 17, as shown in FIGURES 2 and 3.

The arrangement affords a convenient means for connecting a printed circuit panel 18 with a plurality of other similar panels 19, as in the manner shown in FIGURE 4, wherein the panel 18, shown fragmentarily, has a series of printed circuit terminals on its surfaces along one edge which can be engaged by the opposing legs 20 and 21 of the substantially U-shaped tensioned contact element 15 which is compressed into the socket 14. The outer end of the leg 21 of the element 15 is bent to project through the supporting strip 17 to anchor the same when installed in the socket 14, as when applied in the manner shown in FIGURE 2.

It is contemplated that the tang 11 of the member 10 be of any desired length capable of extending through any number of the panels 19 and connected to the circuits printed thereon. A proper connection with each circuit, none of which is shown, is insured by a solder bond 22, as shown in FIGURE 4. The terminal tab 12 will thus provide a means for wiring around a broken circuit connection on any of the panels 19 even if the element 10 is enclosed in a connector receptacle 23 or 24, such as shown in FIGURES 6, 7, 8, 11 and 13, and which will be presently described. This is accomplished by tying in an auxiliary conductor from one of the tabs 12 to another of the same series, or to one of the opposite series. It is also intended that any one of the tabs 12 may be connected directly to a broken or defective connection on the perpendicular panel 18 (FIGURES 2 and 4) to bypass the connection between the panel 18 and the member 10 through the tensioned element 15 (FIGURES 2, 3 and 4).

One of the important features of the invention is the provision of the extended terminal tab 12 which is exposed and accessible, at all times, for the connection of conductors whereby any circuit may be connected to another, or a defective terminal may be by-passed. The body 10, however, may assume a variety of forms, such as the wire construction shown in FIGURES 6, 7 and 8 wherein the tang 25 is round in transverse section and a loop 26 is formed on the upper end thereof whereby, when the elements are opposingly paired, and arranged in the receptacles 23 or 24, a tensioned contact can be provided for the panel 18 and a positive connection assured.

Figure 6:
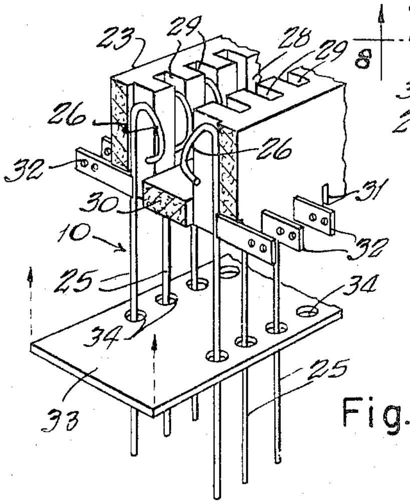
FIGURE 6 is a fragmentary perspective illustration, partially in section, showing another modified form of the invention embodied in a terminal receptacle having a removable base plate.
Figures 7, 8:
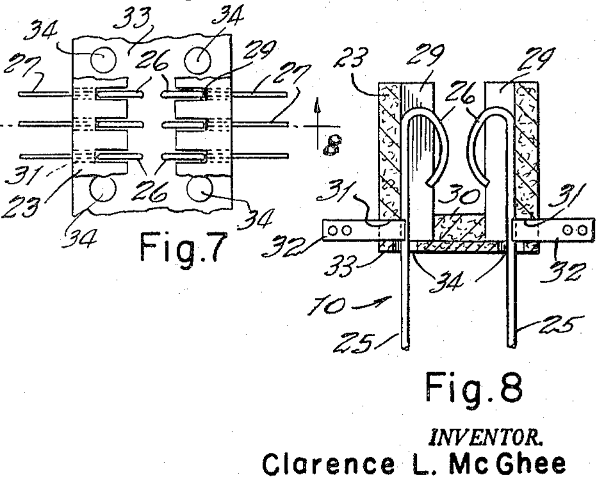
FIGURE 7 is a fragmentary plan view of the assembly shown in FIGURE 6.
FIGURE 8 is a transverse sectional view, on line 8—8 of FIGURE 7, of a terminal contact element embodying the invention and installed in a terminal receptacle.

The connector receptacle 23 comprises a molded shell of non-conductive plastic material, having some degree of flexibility to adapt the same to be applied to irregular mounting surfaces, and having a longitudinal dimension suited to the use to which it may be applied. A channel 28 is formed longitudinally of the body to receive a panel 18 having a circuit printed on each side thereof. Each wall of the channel 28 has a series of slots or cavities 29 which are opposingly paired and are open through the bottom 30 of the channel 28, as illustrated in FIGURES 6 and 8.

Figure 13:
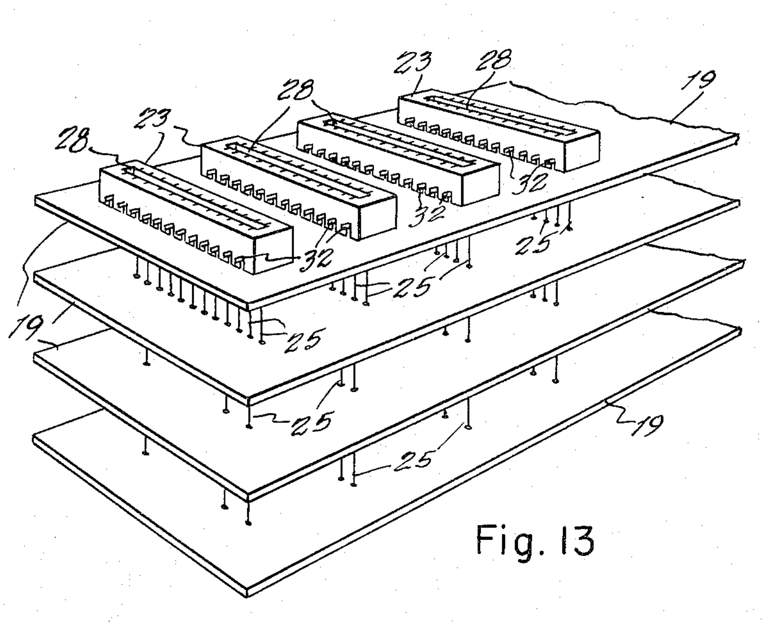
FIGURE 13 is a fragmentary perspective illustration of a battery or superposed stack of circuit boards showing the application of the invention therein.

A recess 31 is formed transversely of each wall of the channel 28 at the base of each of the cavities 29 to receive the extended terminal tab 32 whose inner end is soldered to the tang 25 and projects at right-angles therefrom through the recesses 31 and beyond the outer surfaces of the receptacle 23 where it is readily accessible for the attachment of a conductor. A retainer strip 33, also of a non-conductive plastic material, is cemented to the bottom 30 of the receptacle 23 and has perforations 34 therein through which the tangs 25 are extended, as apparent in FIGURES 6 and 8, and which are capable of being connected to a plurality of circuit panels 19 in superposed relation, as shown in FIGURE 13.

Figure 9:
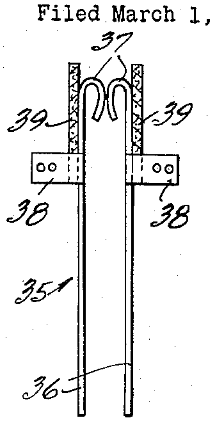
FIGURE 9 is an elevational illustration of a further modification of the invention in opposed arrangement between a pair of mold strips, the latter being shown in transverse section.
Figure 10:
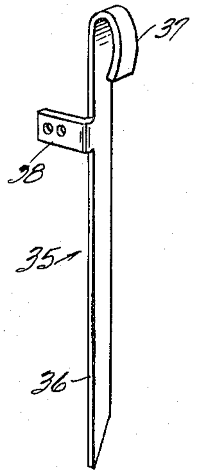
FIGURE 10 is a perspective illustration of the form of the invention shown in FIGURE 9.

In FIGURES 9 and 10 are illustrated a still further modified form of the terminal connector which is comprised of a relatively thin metal strip 35 of conductive metal whose tang 36 has the same general shape as that of the member 10, shown in FIGURES 1, 2 and 4, but whose upper end is curved outwardly and downwardly to form a yieldable hook 37. A terminal tab 38 is formed integral with one longitudinal edge of the strip 35, and at right-angles thereto, and is turned back opposite the hook 37 and perpendicular to the planar surface of the strip 35. The member 35 is adapted to be installed in the receptacle 23, or may be paired, as shown in FIGURE 9, between two strips of molding 39 so that the hooks 37 are opposingly arranged to frictionally receive a printed panel 18. The tangs 36 may be connected to a series of superposed circuit panels 19 in the manner shown in FIGURE 4. The member 35 is also adapted to be molded into the connector receptacle 24 illustrated in FIGURE 11.

Figures 11, 12:
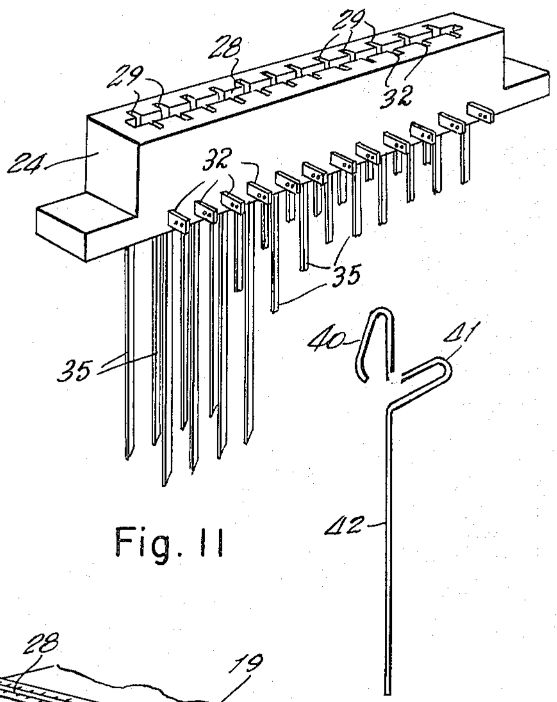
FIGURE 11 is a perspective illustration of the invention installed in a molded terminal receptacle and showing the exposed terminal tabs, and wherein the terminal elements are embedded in the receptacle.
FIGURE 12 is a side elevational view of a still further modification of the invention.

FIGURE 12 shows a modification of the terminal connector which may be formed from a metal strip having a hook 40 formed on its upper end and having a U-shaped loop formed opposite the hook 40 to provide a terminal tab 41. The tang 42 may assume the form of the members 10 and 35, shown in FIGURES 1, 2, 4 and 10.

The invention is obviously capable of certain changes and modifications in structure and design, by persons skilled in the art, without departing from the spirit and intent of the invention or the scope of the appended claims.

What is claimed is:

1. In an assembly of interconnected miniature electrical circuits arranged on a plurality of superposed panels, a contact receptacle for said panels, contact elements for installation in pairs in opposing arrangement in said contact receptacle, each comprising an elongated tang member of sufficient length to extend through a series of parallel spaced circuit panels for connection into the circuits thereon, a terminal tab formed on one side and at right-angles to said tang member, a yieldable loop formed on one end of said tang member opposite to said terminal tab whereby, when said tang member is opposingly paired with a like member, the loops on said paired tang members frictionally engage the opposing surfaces of a circuit panel inserted therebetween and in contact with a circuit printed thereon, and means for securing said contact element in pairs in said contact receptacle whereby said terminal tab is accessible exteriorly of said receptacle.

2. In a series of micro-miniature interconnected electrical circuits, each imprinted on a panel and closely spaced in superposed relationship, a contact receptacle for said panels, a contact terminal element adapted for installation in pairs in opposing relationship in said contact receptacle, the said terminal element having a tang member of indeterminate length sufficient to extend through a plurality of said superposed panels and connected to each of said circuits thereon, a terminal tab formed on said element and perpendicular to said tang member, a yieldable loop formed on said element opposite said tab whereby, when said contact element is paired with another, the loops of both elements are capable of frictionally engaging the opposing surfaces of a circuit panel therebetween, and means on said contact terminal element for securing the same in said contact receptacle on said assembled panels.

References Cited by the Examiner

FOREIGN PATENTS 70,102 10/58 France.
(1st Addition to No. 1,150,441)
843,797 8/60 Great Britain.

JOSEPH D. SEERS, *Primary Examiner.*